March 5, 1940.  W. D. COCKRELL  2,192,735
ELECTRIC CONTROL CIRCUIT
Filed June 23, 1938
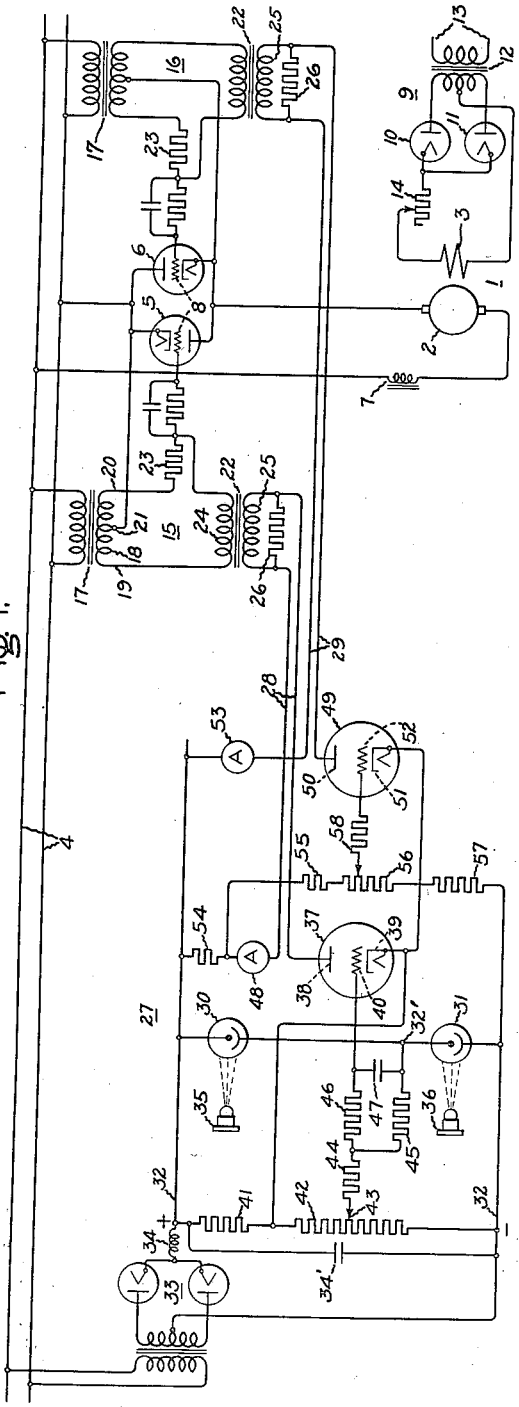
Inventor:
William D. Cockrell,
by Harry E. Dunham
His Attorney.

Patented Mar. 5, 1940

2,192,735

UNITED STATES PATENT OFFICE 2,192,735

ELECTRIC CONTROL CIRCUIT

William D. Cockrell, Schenectady, N. Y., assignor to General Electric Company, a corporation of New York Application June 23, 1938, Serial No. 215,413

4 Claims. (Cl. 250—41.5)

My invention relates to electric control circuits and more particularly to circuits employing electric valve means.

In industrial operations, it is frequently desirable to control the operation of electrical devices in response to the current conducted by light sensitive electric valves. For example, in arrangements where it is desired to maintain sheet material in a predetermined relation or position with respect to rollers or conveyors, light sensitive electric valves have been employed. Owing to the limited current which can be conducted by the ordinary or commercial type of light sensitive device, it is important to employ electric valve apparatus for amplifying the current conducted by the light sensitive valves. As an additional matter, in many control circuits or controlling arrangements it is desirable to employ a pair of control circuits in which the current varies in inverse relation with respect to the current conducted by a light sensitive electric valve. For example, where it is desired to control the speed and direction of rotation of a motor of the direct current type, the magnitude and direction of the current transmitted to the motor may be controlled by employing a pair of oppositely or reversely connected electric valve means which are interposed between a winding of the motor and an alternating current supply circuit. In order that these last mentioned electric valves may be controlled conveniently, it is sometimes desirable to employ separate circuits the currents of which vary in an inverse relation. In accordance with the teachings of my invention described hereinafter, I provide a new and improved electric valve control circuit which operates in response to the current conducted by a light sensitive electric valve, or a pair of light sensitive electric valves, to vary the current supplied to a pair of control circuits.

It is an object of my invention to provide new and improved electric control circuits.

It is another object of my invention to provide new and improved electric valve control circuits.

It is a further object of my invention to provide new and improved control circuits for use in connection with light sensitive electric valves.

In accordance with the illustrated embodiments of my invention, I provide new and improved circuits for transmitting variable amounts of unidirectional current to a pair of control circuits in accordance with the current conducted by light sensitive electric valves. A pair of serially connected light sensitive electric valves are connected across a source of direct current. The amount of light to which the valves are subjected is varied and hence the current conducted by the light sensitive valves is also varied. A pair of electronic discharge devices are associated with a pair of control circuits. Each of the discharge devices is provided with a control grid and the potentials impressed on the control grids are varied so that the speed and direction of rotation of an electric motor is controlled in response to the currents conducted by the light sensitive valves. I provide anti-hunting or coupling means responsive to the current conducted by the light sensitive valves for controlling the rate of change of the potential impressed on the control grid of one of the electronic discharge devices. The coupling means superimposes on the grid of one of the discharge devices a potential to increase the rate of change of current conducted by the discharge device in response to variations in current conducted by the light sensitive valves, thereby providing an arrangement which quickly follows rapid changes in the amount of light to which the light sensitive valves are subjected and prevents hunting caused by the back-lash or inertia of the system. The magnitude and direction of current transmitted to the motor vary in accordance with the amount of current conducted by each of the light sensitive electric valves. Furthermore, the magnitude and polarity of the current transmitted to the motor varies in accordance with the relative magnitudes of the currents conducted by the light sensitive valves.

For a better understanding of my invention, reference may be had to the following description taken in connection with the accompanying drawing and its scope will be pointed out in the appended claims. Fig. 1 of the accompanying drawing diagrammatically illustrates an embodiment of my invention as applied to a system for controlling the energization of a direct current motor, and Fig. 2 is a modification of the arrangement shown in Fig. 1.

Referring now to Fig. 1 of the accompanying drawing, I have chosen to represent my invention as applied to an electric system for controlling a motor 1. The motor 1 may be of the direct current type having an armature winding 2 and a field winding 3. The armature winding 2 may be energized from an alternating current supply circuit 4 through a pair of reversely connected electric valve means 5 and 6 and an inductance 7 which may be of the saturable type. The electric valve means 5 and 6 control the magnitude and direction of the current transmitted to the motor armature 2 and hence control the speed and direction of rotation of motor 1. The electric valve means 5 and 6 are preferably of the type employing an ionizable medium, such as a gas or a vapor, and each includes a control member 8 which renders the associated electric valve conductive. To supply unidirectional current to the field winding 3 of motor 1, I may employ any conventional arrangement such as a bi-phase rectifier 9 including a pair of unidirectional conducting devices, such as electric valves 10 and 11, a transformer 12 which may be energized from any suitable source of alternating current 13 and a current controlling means such as an adjustable resistance 14.

As a means for controlling the conductivities of the electric valves 5 and 6, I employ excitation circuits 15 and 16. The excitation circuits 15 and 16 impress on the control members 8 of the electric valves 5 and 6 periodic voltages which are variable in phase with respect to the applied anode-cathode voltages. The circuits 15 and 16 are similar in construction and arrangement and each includes a transformer 17 which is energized from the alternating current circuit 4 and is provided with a secondary winding 18 having terminal connections 19 and 20 and an electrically intermediate connection 21. To obtain periodic voltages which are adjustable in phase in accordance with a predetermined controlling influence, such as the magnitude of a unidirectional current, I employ phase shifting circuits of the static impedance type including saturable inductances 22 and resistances 23. Each of the inductances 22 includes a winding 24 which is connected in series relation with the associated resistance 23 and is connected across the terminals of the secondary windings 18. The inductances 22 are also provided with control windings 25 which control the inductive reactance of the windings 24 and hence control the phase shift between the voltages impressed on the control members 8 and the anode-cathode voltages of the electric valves 5 and 6. Resistances 26 may be connected across the control windings 25 to limit the rate at which the control voltages, which are impressed on the control members 8, may be shifted in phase.

I provide a control circuit 27 including a pair of electric discharge paths for controlling the amount of current transmitted to control circuits 28 and 29 which are associated with the saturable inductances 22 of excitation circuits 15 and 16, respectively. The circuits 28 and 29 transmit variable amounts of current in accordance with the relative magnitudes of currents conducted by light sensitive electric valves 30 and 31. The light sensitive electric valves 30 and 31 may be connected in series relation. I employ a suitable source of unidirectional current 32 which may be provided by any well known arrangement, such as a bi-phase rectifier 33, which may be energized from the alternating current supply circuit 4. A smoothing reactance 34 may be connected in series relation with the output of the rectifier 33. A capacitance 34' may also be connected across the direct current source to act as a filter. The electric valves 30 and 31 are arranged to respond to the amount of light received from light sources 35 and 36, respectively. The light sensitive valves 30 and 31 and the light sources 35 and 36 may be associated with a sheet material, or the like, which is maintained in a predetermined position with respect to processing and conveying equipment. For example, the light sensitive valves and the light sources may be employed to maintain sheet material in a given position or in spaced relation upon the rollers of an ordinary conveyor.

I provide an electronic discharge device 37 which constitutes one of the discharge paths and is preferably of the high vacuum type and which controls the energization of control circuit 28 in accordance with the potential of the common juncture 32' of the light sensitive valves 30 and 31, or, in other words, the electronic discharge device 37 controls the energization of circuit 28 in accordance with the relative magnitudes of the currents conducted by light sensitive valves 30 and 31. Electronic discharge device 37 includes an anode 38, a cathode 39 and a control grid 40. The cathode 39 is connected to a point of relatively positive potential with respect to that of grid 40, the potential being derived from a voltage divider including a pair of serially connected resistances 41 and 42. The voltage divider is connected across the direct current source 32. The resistance 42 may be provided with an adjustable tap 43 for adjusting the potential of the control grid 40 relative to that of the cathode 39. As a means for varying the potential of the control grid 40 in accordance with the currents conducted by the electric valves 30 and 31, and hence in accordance with the relative magnitudes of these currents, I provide an impedance element such as a resistance 44 which is connected to the common juncture of electric valves 30 and 31 through a resistance 45.

I provide an anti-hunting or coupling means for controlling the rate of change of the potential of the control grid 40 of electronic discharge device 37. The anti-hunting or coupling means may comprise a serially connected resistance 46 and a capacitance 47 which are connected across the resistance 45. The transient potential appearing across resistance 46 which is impressed on the control grid 40 due to rapid changes in the current conducted by the light sensitive valves 30 and 31, tends to increase the variations of current transmitted to the control circuit 28 when a rapid action is desired. If desired, an ammeter 48 may be connected in series relation with the electronic discharge device 37.

To effect control of the current transmitted to control circuit 29 in inverse relation with respect to the current of circuit 28, I provide an electronic discharge device 49 which constitutes the second electric discharge path and which is of the same general type as discharge device 37 and is provided with an anode 50, a cathode 51 and a control grid 52. An ammeter 53 may be connected in series relation with the discharge device 49 if desired. A suitable means, such as a resistance 54, is connected in series relation with the electronic discharge device 37 to vary the potential impressed on control grid 52 so that the current of circuit 29 varies in an inverse relation with respect to that of circuit 28. The control grid 52 is connected to a voltage divider including resistances 55, 56, and 57 through a current limiting resistance 58.

The operation of the embodiment of my invention shown in Fig. 1 will be explained by considering the operation of the system when the system is operating to control the speed and direction of rotation of the motor 1 in accordance with the currents conducted by the light sensitive valves 30 and 31. In other words, if the light sensitive valves 30 and 31 and the light sources 35 and 36 are used in a spacing or a positioning operation, it may be considered that the system is operating to maintain a predetermined distribution of light upon the light sensitive valves 30 and 31.

The excitation circuits 15 and 16 are adjusted so that, under the predetermined light distribution on the valves 30 and 31, the motor 1 is at a standstill. That is, the electric valves 5 and 6 are conducting current during equal intervals of time during each half cycle of voltage of circuit 4. Since the currents conducted by valves 5 and 6 are equal and in opposition, the average current supplied to armature 2 will be zero in value and the motor will not rotate. Certain features of the operation of the electric valves 5 and 6, excitation circuits 15 and 16, and the saturable inductance 7 are disclosed and claimed in my copending application for United States Letters Patent Serial No. 155,509, filed July 24, 1937 and assigned to the assignee of the present application. A detailed explanation of the operation of this part of the system may be obtained by reference to that application.

The current transmitted to control circuits 28 and 29 by circuit 27 vary in an inverse relation with respect to each other and are dependent upon the distribution of light from the light sensitive valves 30 and 31. If it be assumed that the light distribution is equal and that the valves 30 and 31 are each conducting an equal amount of current, the current transmitted to circuits 28 and 29 will be equal in magnitude. However, if the current distribution is disturbed, occasioned by electric valves 30 and 31 conducting unequal amounts of current, the currents transmitted to circuits 28 and 29 will vary in an inverse relation with respect to each other, resulting in a shift in phase of the voltages impressed on control members 8 of electric valves 5 and 6 so that a resultant average current is transmitted to armature 2 of motor 1 causing the motor to rotate in the desired direction to effect the corrective action and restoring the desired distribution of light on the light sensitive valves 30 and 31.

For example, if the conductivity or the current conducted by electric valve 30 is decreased, the potential impressed on control grid 40 of discharge device 37 becomes more negative with respect to that of the cathode 39, causing the discharge device 37 to conduct a smaller amount of current and thereby decreasing the current transmitted to circuit 28. However, the current transmitted by the electronic discharge device 49 is increased, due to the fact that the negative voltage derived from the resistance 54 is decreased in magnitude, raising thereby the potential of the control grid 52 relative to that of the associated cathode 51. Therefore, the current transmitted to the control circuit 29 will be increased. If, on the other hand, the current conducted by the electric valve 31 is decreased, the potential of the control grid 40 becomes more positive relative to that of the cathode 39, causing the electric valve 37 to conduct a greater current Due to the conduction of a larger current, the resultant potential impressed on control grid 52 of discharge device 49 will be lowered, effecting a decrease in the current conducted by this device. In this manner, the currents transmitted to the control circuits 28 and 29 vary in inverse relation with respect to each other and vary in magnitude in accordance with the relative currents conducted by the light sensitive valves 30 and 31.

The anti-hunting or coupling circuit, including resistance 46 and capacitance 47, impresses a transient potential on the control grid 40 of discharge device 37 which adds to the voltage produced by resistance 44, thereby causing the currents in circuits 28 and 29 to follow more quickly rapid changes in light and to prevent hunting caused by the back-lash or inertia in the system. Inasmuch as the anti-hunting means controls the operation of the discharge device 37 and since the discharge device 49 is responsive to the current conducted by discharge device 37, the anti-hunting means also controls the operation of the discharge device 49.

In Fig. 2 there is shown a modification of the control circuit 27 of Fig. 1 and which employs an electronic discharge device 59 in which both electronic discharge paths are enclosed in a single envelope. The electronic discharge device 59 is preferably of the high vacuum type comprising a pair of valves 60 and 61, control grids 62 and 63, and cathodes 64 and 65. The cathodes are connected together and are connected to the negative terminal of the direct current source 32 through a resistance 66 which controls the potential of the cathodes so that the sum of the currents conducted by the two discharge paths remains substantially constant. Certain features of this arrangement are disclosed and claimed in my above identified copending patent application Serial No. 155,509. Control grid 62 is connected to the common juncture 32' of the light sensitive electric valves 30 and 31, and control grid 63 is connected to a potentiometer including resistances 67 and 68 which are connected in series relation across the direct current source 32. It will be noted that anode 60 is connected to control circuit 28 and that anode 61 is connected to the control circuit 29.

The currents of circuits 28 and 29 vary inversely with respect to each other, and the magnitudes of the currents vary as the currents conducted by the light sensitive valves 30 and 31. For a smaller amount of current than that necessary to maintain a balance of current in circuits 28 and 29, the potential of the control grid 62 is lowered relative to that of the cathode 64, effecting a reduction in the current transmitted to control circuit 28. However, the current transmitted to control circuit 29 will be increased so that the motor 1 is energized to effect the desired corrective action. In a similar manner, variations in the current conducted by valve 31 will cause changes in the currents transmitted to control circuits 28 and 29. In this manner, the currents transmitted to circuits 28 and 29 vary in accordance with the distribution of light upon light sensitive valves 30 and 31 to effect a corrective operation to restore a desired or predetermined distribution of light upon these valves.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a source of direct current, a light sensitive electric valve, a pair of electric circuits, apparatus for controlling the current in said circuits in response to the current transmitted by said light sensitive electric valve and comprising electric valve means having a pair of electric discharge paths each connected in a different one of said pair of circuits and each including an anode and a control grid, a voltage divider connected across said source, means comprising an impedance element connected between a point of said voltage divider and the control grid of one of said electric discharge paths for controlling the current conducted thereby directly in accordance with the current conducted by said light sensitive valve and means connected in series relation with said one discharge path for impressing on the control grid of the other discharge path a variable potential to control the current conducted thereby in inverse relation with respect to the current conducted by said light sensitive electric valve, and anti-hunting means connected to the control grid of said one discharge path and responsive to the current conducted by said light sensitive valve for controlling the rate of change of the potential of the associated control grid.

2. In combination, a source of direct current, a pair of control circuits connected across said source and each comprising an electronic discharge device having an anode, a cathode and a control member for controlling the current in the associated circuit, a voltage divider connected across said source, the control member of one of said discharge devices being connected to a point on said voltage divider and the cathodes of said discharge devices being connected to a second point more positive in potential than the first mentioned point, means connected in series relation with said one discharge device for impressing on the control member of the other discharge device a potential which varies in an opposite direction to that of the control member of said one discharge device, an impedance element connected between said point and the control member of said one discharge device, and a pair of serially connected light sensitive valves connected across said source for transmitting variable amounts of unidirectional current through said impedance element to control the potential of the control member of said one discharge device.

3. In combination, a source of direct current, a pair of control circuits, a pair of serially connected light sensitive electric valves connected across said source, and means for controlling the current in said pair of circuits in accordance with the current conducted by said light sensitive electric valves and comprising a pair of electronic discharge devices each having an anode, a cathode and a control member and each being connected in circuit with a different one of said pair of circuits, a voltage divider connected across said source, the cathodes of said discharge devices being connected to a point of said voltage divider, an impedance element connected between a relatively negative point of said voltage divider and the control member of one of said discharge devices and being connected to the common juncture of said light sensitive valves, means connected in series relation with said one of said discharge devices for varying the potential of the control member of the other discharge device in opposite relation with respect to the potential of the first mentioned control member and anti-hunting means connected between said light sensitive valves and the control member of said one discharge device.

4. In combination, a source of direct current, a pair of serially connected light sensitive electric valves connected across said source, a load circuit, an alternating current supply circuit, a pair of reversely connected electric valve means connected between said supply circuit and said load circuit for controlling the magnitude and polarity of the current supplied to said load circuit, said electric valve means each being provided with a control member for controlling the conductivity thereof, a pair of control circuits each associated with a different one of said electric valve means for controlling the energization of the associated control member, means for transmitting variable amounts of unidirectional current to said control circuits in accordance with the currents transmitted by said light sensitive electric valves and comprising an electronic discharge device associated with one of said control circuits and having a control grid responsive to a potential of the common juncture of said light sensitive valves and a second electronic discharge device associated with the other of said control circuits and having a control grid, means for impressing on said control grid a potential which varies in a manner to control the conductivity of the associated discharge device inversely with respect to the conductivity of the first mentioned electronic discharge device.

WILLIAM D. COCKRELL.

CERTIFICATE OF CORRECTION.

Patent No. 2,192,735. March 5, 1940.

WILLIAM D. COCKRELL.

It is hereby certified that error appears in the printed specification of the above numbered patent requiring correction as follows: Page 2, second column, line 25, for "hesistance" read resistance; page 4, first column, line 45, claim 2, before the word "point" insert second; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.